UNITED STATES PATENT OFFICE.

SHINGO KUROKI, OF TOKYO, JAPAN.

WATERPROOF PAINT.

1,333,321.      Specification of Letters Patent.      Patented Mar. 9, 1920.

No Drawing.      Application filed May 6, 1919. Serial No. 295,125.

*To all whom it may concern:*

Be it known that I, SHINGO KUROKI, a subject of the Emperor of Japan, and a resident of No. 14 Roppongi-Cho, Azabu-Ku, city of Tokyo, Empire of Japan, have invented new and useful Improvements in Waterproof Paint, of which the following is a specification.

This invention relates to improvements in the manufacture of insoluble paint, such as are employed for preserving and waterproofing marine gear, such as fishing nets, ropes and the like, and for analogous uses, the object of the invention being to produce a paint of this kind which is cheap, which may be readily worked, and which possesses water resisting qualities to a high degree.

According to this invention gluten is fermented until it is transformed into a viscoidal liquid which is readily miscible with either water or oil. Camphor oil is mixed therewith to prevent excess fermentation and formalin added to render the same insoluble, as hereinafter described and claimed.

In carrying out my improved process I mix wheat flour with water in the proportion approximately of eight and one-half pounds of the flour to two thousand grams of water and carefully knead the same for about two hours to convert the same into a sticky mass. The mass is then washed repeatedly in a suitable vessel until all of the soluble starch matters are carried off with the water. The residue is a pure insoluble gluten. The gluten thus obtained is then placed in a suitable warming chamber having a temperature preferably from 75° to 80° F. and is permitted to remain there from five to seven days until the entire mass is converted by gradual fermentation into a viscoidal liquid of brownish appearance and which is capable of being readily mixed with either water or oil. To this brownish viscoidal liquid I then add camphor oil in the proportion of one thousand grams of the liquid to two hundred grams of the oil. This produces the base of my paint. To this base paint I then add formalin to make the same insoluble in water and in the proportions of about one thousand grams of the base paint to three hundred grams of the formalin.

When it is desirable that the finished product shall be dried and colored, I add to the brownish viscoidal liquid white clay and the necessary pigment, preferably in the proportion of one pound and one and one-half pounds respectively, which is then dried and ground to powder.

Originally the gluten obtained from wheat flour somewhat resembles soft rubber and is absolutely insoluble and entirely wash proof even in iodin water. However, it is transformed into a sticky liquid after having undergone the fermenting operation hereinbefore set forth, although at this stage of the operation it is not yet suitable for use in a paint.

According to this invention, this fermenting operation is continued until the entire mass of gluten is converted into a brownish liquid to such an extent as to be readily miscible with water and oil and so that the same may be readily worked either by diluting or concentrating it according to the nature of the paint to be produced.

My invention further contemplates the use of camphor oil to prevent excess fermentation. The camphor oil besides checking the fermentation gives the finished product a glassy appearance. Moreover, the use of camphor oil increases the water resisting and antiseptic qualities of my paint and causes the same to greatly increase the durability of the material painted therewith.

The addition of the formalin to the base paint renders the product positively insoluble in water and even to repeated washing in hot water.

Having thus described my invention, I claim:

The process of manufacturing waterproof paint consisting in transforming gluten by fermentation into a viscoidal liquid which is readily miscible with either water or oil, mixing camphor oil therewith to prevent excess fermentation and adding formalin thereto to render the same insoluble.

In testimony whereof I affix my signature in presence of two witnesses.

SHINGO KUROKI. [L. S.]

Witnesses:
    H. YASUMURA,
    M. OTSUKA.